M. CHASE & Z. SARGENT.
Apparatus for Waxing Thread.

No. 220,465. Patented Oct. 14, 1879.

Witnesses:

Inventors:
Milton Chase,
Zebadiah Sargent,
by
James E. Maynadier.
their atty.

3 Sheets—Sheet 3.

M. CHASE & Z. SARGENT.
Apparatus for Waxing Thread.

No. 220,465. Patented Oct. 14, 1879.

Witnesses:
Wm J. Prytox
A. H. Norris.

Inventors:
Milton Chase
Zebadiah Sargent
by
James E. Maynadier,
their atty.

UNITED STATES PATENT OFFICE.

MILTON CHASE, OF HAVERHILL, MASSACHUSETTS, AND ZEBADIAH SARGENT, OF ROCHESTER, NEW HAMPSHIRE; SAID SARGENT ASSIGNOR TO SAID CHASE.

IMPROVEMENT IN APPARATUS FOR WAXING THREAD.

Specification forming part of Letters Patent No. 220,465, dated October 14, 1879; application filed August 29, 1873.

*To all whom it may concern:*

Be it known that we, MILTON CHASE, of Haverhill, in the county of Essex and State of Massachusetts, and ZEBADIAH SARGENT, of Rochester, in the county of Strafford and State of New Hampshire, have invented an Improved Apparatus for Waxing Thread, of which the following is a full, clear, concise, and exact description, reference being had to the accompanying drawings, making a part hereof, in which—

Figure 1:
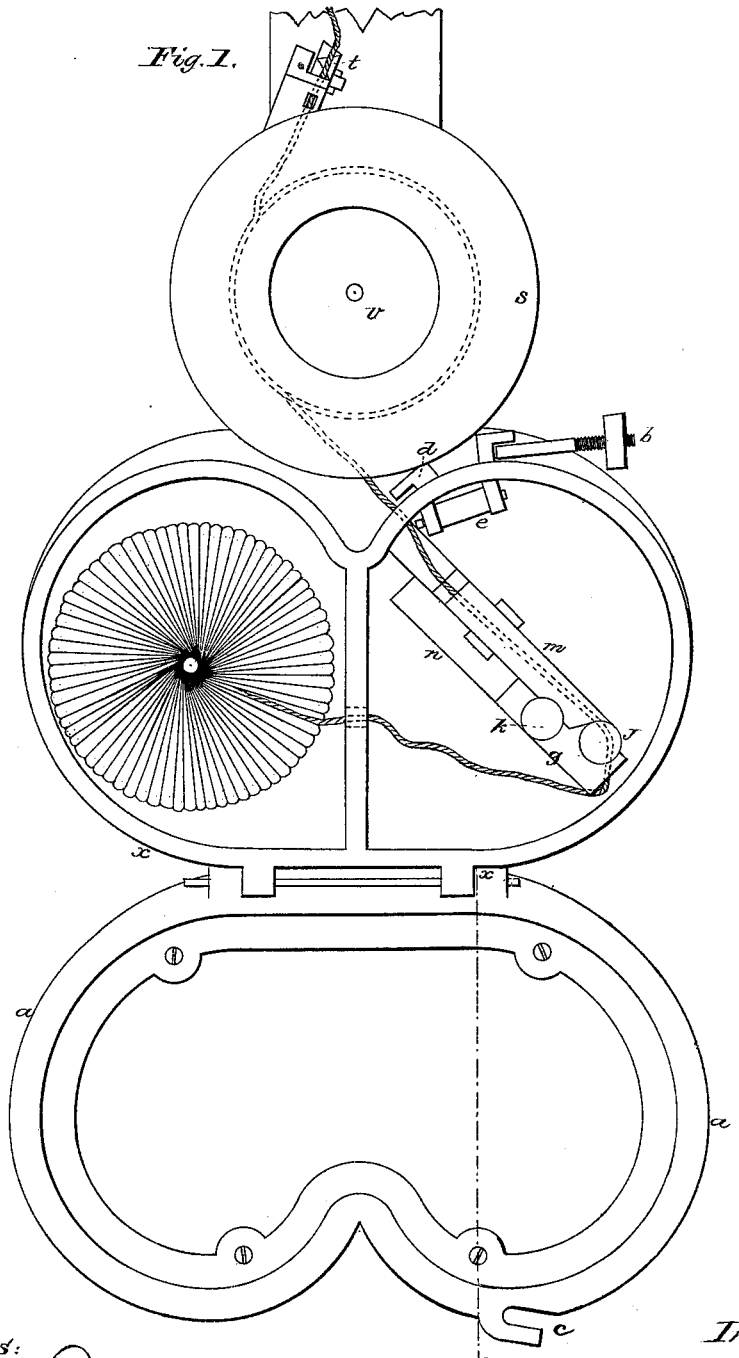
Figure 2:
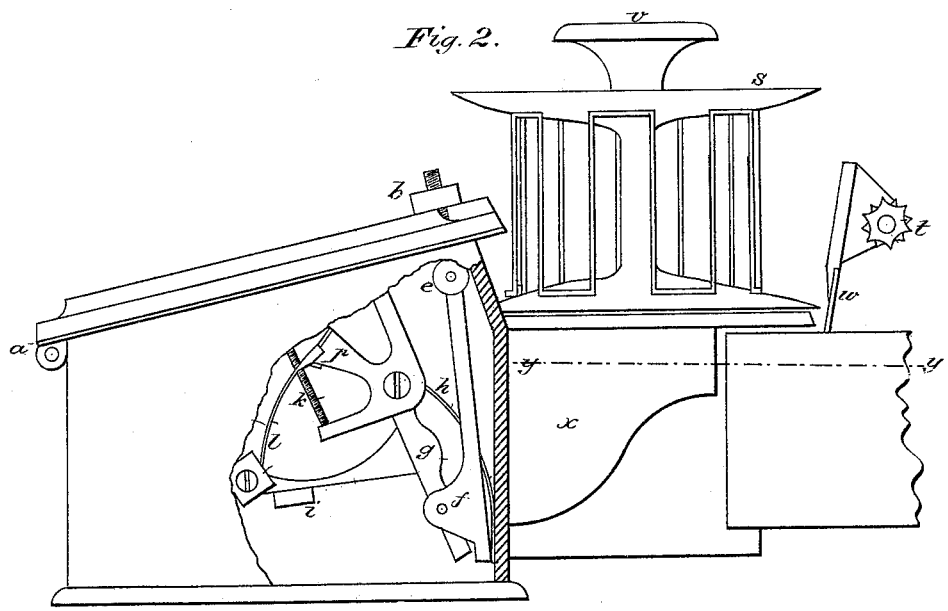
Figure 6:
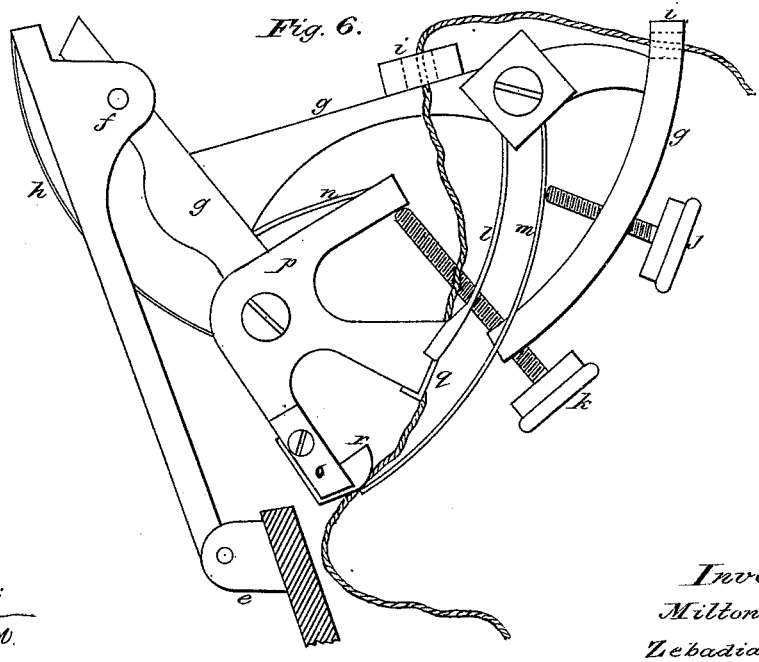
Figure 3:
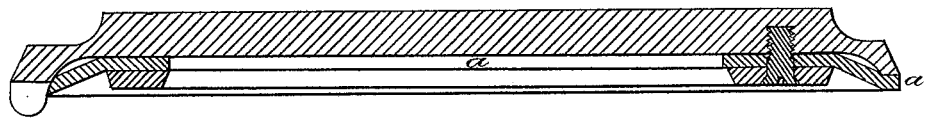
Figure 10:
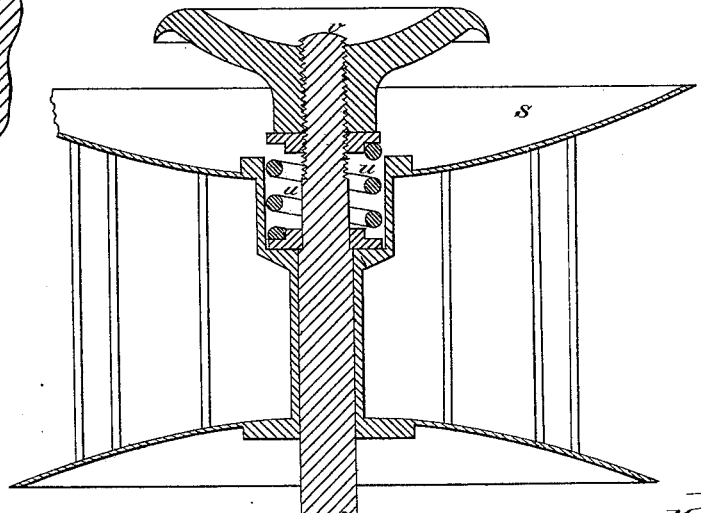

Figure 1 is a plan of our apparatus with the cover thrown open. Fig. 2 is a side elevation with part of the box cut away, so as to show the stripping device. Fig. 3 is a section on the line $x\ x$, Fig. 1. Fig. 6 shows the stripping device. Fig. 10 is a section on the line $y\ y$, Fig. 2. The other figures show details and will be referred to hereinafter.

In waxing thread for use on the sewing-machine it is, of course, impracticable to wax by hand with hard wax, and usually melted wax has been used.

To avoid the difficulties in this process, which are considerable, "liquid wax" (so called) has sometimes been used. In that case it is desirable to use it in a vessel closed to the air, or nearly so, and an apparatus for this purpose is shown in the Letters Patent granted to us, No. 131,786, dated October 1, 1872.

Our present invention is an improved apparatus for the same purpose, and its several features will now be described in detail.

The first feature of our invention consists in a wax-reservoir adapted to receive the ball of thread, so that no opening will be necessary for the entrance of the thread into the wax, the orifice for the exit of the thread being the only one required while the apparatus is in use.

The purpose of this reservoir is to keep the outer air from the wax as much as possible while the apparatus is in use, and when not in use the whole reservoir is easily made airtight.

We prefer to put the thread in a separate compartment of the reservoir, with an opening for the thread to pass to the wax, as shown in Fig. 1; but, if preferred, the spool or ball of thread may be kept in the wax, so that it will be more fully saturated.

The joint between the lid and the body of the reservoir should be made tight in some convenient way. The most convenient way known to us is by means of a rubber gasket, which is secured in place by a metal strip secured to the cover, as shown in Figs. 1 and 3. This lid is so shaped and mounted on its hinge that in closing it will first bind at a point, $a$, at the opposite side of the reservoir from the fastening $b$, and when pressed closer will next bind at the intermediate successive points on each side, and will press last at the point where the fastening $b$ is placed. Thus, by forcing down the lid with the fastening $b$, the whole of the gasket is compressed, and the whole rim is made air-tight. This lid is shown in Figs. 1 and 2.

The fastening $b$, Figs. 1 and 2, is a bolt pivoted on a pin on the outside of the reservoir, and turned down when the reservoir is opened, as shown in Fig. 1.

To fasten the lid down the bolt is turned up into the slot $c$ and the nut screwed down until the lid is tight. By this means neither the bolt nor its nut need ever be separated from the reservoir, and thus the danger of losing them is avoided.

Figure 5:
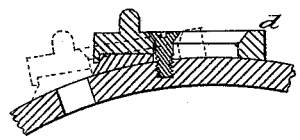

The plate $d$ has a rubber pad on its bearing-surface, (shown in Fig. 5,) which is placed over and completely closes the exit-opening for the thread when the apparatus is not in use.

Another part of our invention relates to the apparatus for passing the thread through the wax.

The strippers are supported by the piece $p$, which is pivoted to the piece $g$. This piece $g$ is pivoted to the arm $f$, hinged to the reservoir, and a spring, $h$, attached to the arm $f$, bears upon it. By thus mounting the piece $g$ it yields to knots in the thread, so that the thread will not break.

Upon the piece $g$ we place the guides $i\ i$, through which the thread is guided down into the wax. Instead of these guides agitators may be used, if desired, as shown in our former patent; but in our present apparatus we do not find this necessary. This piece $g$ also bears the thumb-screws $j$ and $k$ and the springs $l$, $m$, and $n$.

The strippers on which the springs $l$ and $m$ press are mounted on piece $p$, which is pressed by the spring $n$ around on its axis against the end of the thumb-screw $k$, so that by turning the thumb-screw $k$ the piece $p$ may be turned either to or from the springs; but it is obvious that it may be moved in both directions by the thumb-screw alone, if desired.

Figure 7:
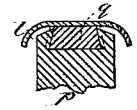

The spring $l$ is broader than the stripper $q$ and bends around it, as shown in Fig. 7, and by this means the superfluous wax is very well removed, and by means of the thumb-screw $j$ the tension of the spring $m$, which bears on the stripper, may be regulated, so that the wax will be properly cleaned off and the thread rounded. This device is shown in Fig. 6.

Figure 8:
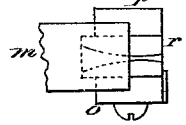

Fig. 8 shows one of the strippers with the spring bearing on it in plan. These strippers have a groove cut in them, through which the thread passes, being pressed in it by the spring, so that the superfluous part of the wax is removed in the passage and the thread thereby rounded.

In order to fit different sizes of thread the groove is made tapering, so that by changing the position of the spring in relation to its stripper the size of the aperture formed by the groove and the spring can be made larger or smaller to fit the thread, as shown.

The strippers we prefer to make of hard metal, such as steel, or some hard mineral substance, such as glass or black diamond, to prevent wear, diminish friction, and make the thread smoother.

The bearing part of the springs may, if desired, be made with depressions or projections corresponding to the grooves in the strippers; but in practice we find that the strippers work very well without them.

Figure 9:
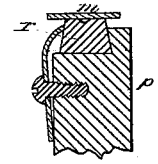

The strippers are secured in place by a clamp, $o$, and screw, as shown, applied to the stripper $r$ in Figs. 6, 8, and 9, or by dovetailing the arm on which it rests, as shown, applied to the stripper $q$ in Fig. 7.

Figure 4:
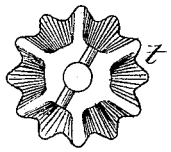

The best form of tension device adapted for use with our apparatus consists of an open spool, $s$, mounted on the usual spindle $r$, the tension being regulated, in the usual way, by a nut and spring, $u$. (See Fig. 10.) An open spool should be used instead of the cylinder ordinarily used, in order that there may be as little surface as possible in contact with the newly-waxed thread, which is sticky. The thread-guide $t$, for the same reason, should be made, as shown in the drawings, with a series of edges to support the thread, instead of the usual surface. It is a grooved pulley—grooved in order to guide the thread; but if it were an ordinary grooved pulley the thread would be crowded down into the groove, thereby causing it to stick, and making the thread rough, and also filling the groove with wax. This pulley is like an ordinary grooved pulley, with the walls of the groove so cut away as to leave only grooved edges, so that the waxed thread, instead of lying in contact with the grooved periphery of the pulley, is stretched over the grooved edges which form its periphery, so that it is properly guided, and yet only a small portion of the waxed thread is brought into contact with the periphery of the pulley. (See Figs. 2 and 4.)

Figure 11:
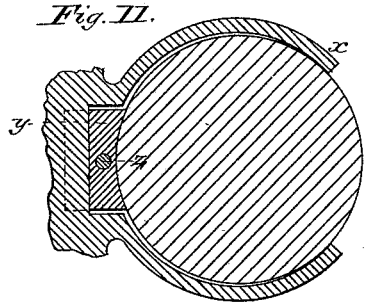
Figure 12:
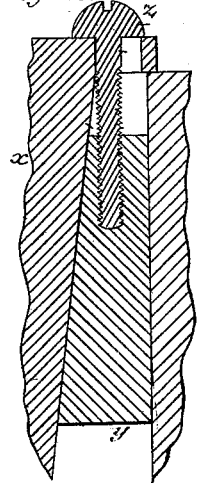

The last feature of our invention consists in the means of securing the waxer to the McKay sewing-machine. Figs. 11 and 12 show this.

A segment, $x$, strengthened by a ring above of smaller radius, embraces the arm of the McKay sewing-machine, and a wedge of metal, $y$, is drawn upon an inclined plane by a screw, $z$, so that it will bear upon the McKay arm, and its pressing-surface will always be parallel to the surface of the arm.

To attach the apparatus, the spool is removed from the arm of the machine, and the wedge $y$ is lowered by the screw $z$, and the apparatus is then set over the arm until the metal ring at the top of the segment $x$ rests upon the top of the arm with the segment $x$ around the arm. The screw is then tightened until the arm is tightly wedged in the segment, when the spool $s$ may be placed in position.

What we claim as our invention is—

1. The improved reservoir above described, having a close cover and but one thread-passage, substantially as described.

2. The combination of the strippers and guides with the rod $f$ and the reservoir, whereby the strippers and guides may be readily lifted and lowered, all substantially as described.

3. The stripping apparatus composed of the three pieces $f$, $g$, and $p$, combined together as shown.

4. A stripper made in two parts, one of which is yielding to allow the passage of knots or other protuberances upon the thread, in combination with a yielding support, substantially such as is described, which allows the whole stripper to be pulled forward against a spring as its parts are separated by a knot or protuberance passing between them, all as and for the purpose specified.

5. A stripper formed by a conically-grooved piece, $r$, and a spring, $m$, and means for moving them relatively to each other, such as described, whereby the size of the apparatus for the thread may be increased or diminished by changing the relation of the spring to the conical groove, all as set forth.

6. The combination of a stripper, $q$, its spring $l$, the lever $p$, set-screw $k$, lever $g$, and spring $h$, substantially as described.

7. The clamping-segment $x$, and wedge $y$, and screw $z$, combined and operating with the wax-reservoir, substantially as described.

MILTON CHASE.
    ZEBADIAH SARGENT.

Witnesses:
  JOSEPH K. JENNESS,
  JONES FRANKLE.